(12) United States Patent
Williams et al.

(10) Patent No.: US 8,461,510 B2
(45) Date of Patent: Jun. 11, 2013

(54) OCCUPANCY SENSOR AND AMBIENT LIGHT CONTROL

(75) Inventors: Jonathan D. Williams, Austin, TX (US);
Thomas J. Hartnagel, Taylor, TX (US);
Robert A. Martin, Pflugerville, TX (US); R. Kurt Bender, Dripping Springs, TX (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 13/361,118

(22) Filed: Jan. 30, 2012

(65) Prior Publication Data
US 2012/0175494 A1    Jul. 12, 2012

Related U.S. Application Data

(62) Division of application No. 12/470,234, filed on May 21, 2009, now Pat. No. 8,143,567.

(51) Int. Cl.
*G01J 1/44*     (2006.01)
*G08B 13/00*    (2006.01)

(52) U.S. Cl.
USPC ............. 250/214 AL; 340/541; 340/567

(58) Field of Classification Search
USPC ............. 250/221, 214 AL; 362/641, 642; 340/565–567, 541
See application file for complete search history.

(56) References Cited

U.S. PATENT DOCUMENTS

| | | |
|---|---|---|
| 6,215,398 B1 | 4/2001 | Platner et al. |
| 6,415,205 B1 | 7/2002 | Myron et al. |
| D535,204 S | 1/2007 | Bender et al. |
| 7,411,489 B1 | 8/2008 | Elwell et al. |
| 2007/0229297 A1 | 10/2007 | Leonard et al. |
| 2008/0030140 A1 | 2/2008 | Pape et al. |
| 2008/0167834 A1* | 7/2008 | Herz et al. .......... 702/150 |

* cited by examiner

*Primary Examiner* — Thanh Luu
(74) *Attorney, Agent, or Firm* — Garrett V. Davis; Mark S. Bicks; Alfred N. Goodman

(57) ABSTRACT

An occupancy sensor is provided with a separable override unit which can selectively override the operation of the occupancy sensor at designated times and for selected time intervals. The occupancy sensor includes a light sensor for actuating the occupancy sensor and a light assembly when the ambient light is below a predetermined level and to deactivate the occupancy sensor when the ambient light is above a threshold level to prevent the light assembly from being actuated when the light level is sufficient to avoid the need for actuating the light assembly. The override unit is removably attached to the occupancy sensor and is provided with a light source, such as an LED. The override unit is coupled to the occupancy sensor to emit light to actuate the light sensor of the occupancy sensor, thereby controlling the operation of the occupancy sensor, such as by preventing the occupancy sensor from being actuated regardless of the light level in the surrounding areas. The occupancy sensor includes a cavity on a top surface for receiving the override unit. The light sensor of the occupancy sensor is positioned in the cavity. The LED on the override unit in on an end that is inserted into the cavity to align with the light sensor. A control unit is operatively connected to one or more override units for selectively controlling the normal operation of the occupancy sensor.

28 Claims, 14 Drawing Sheets

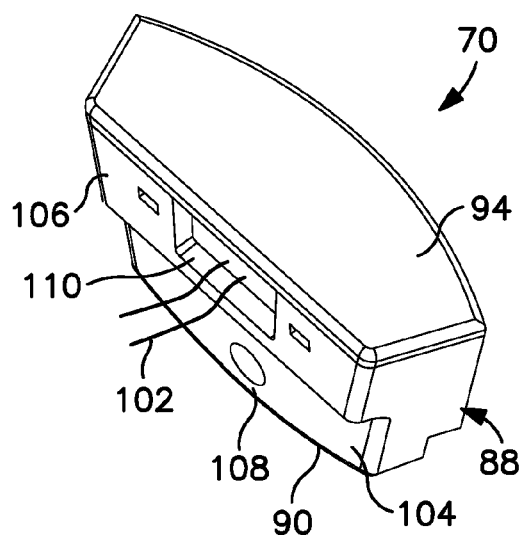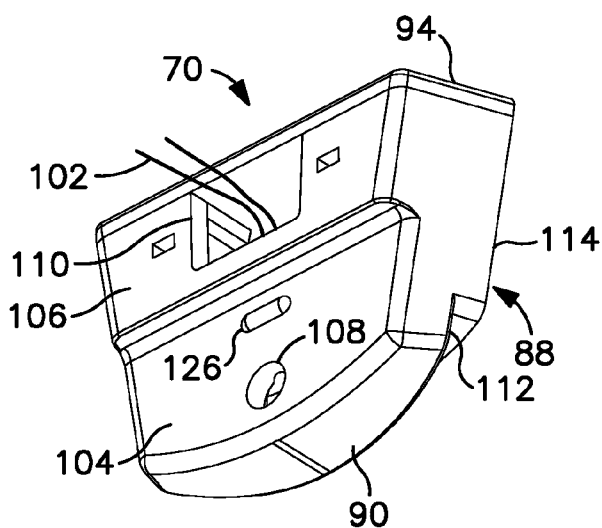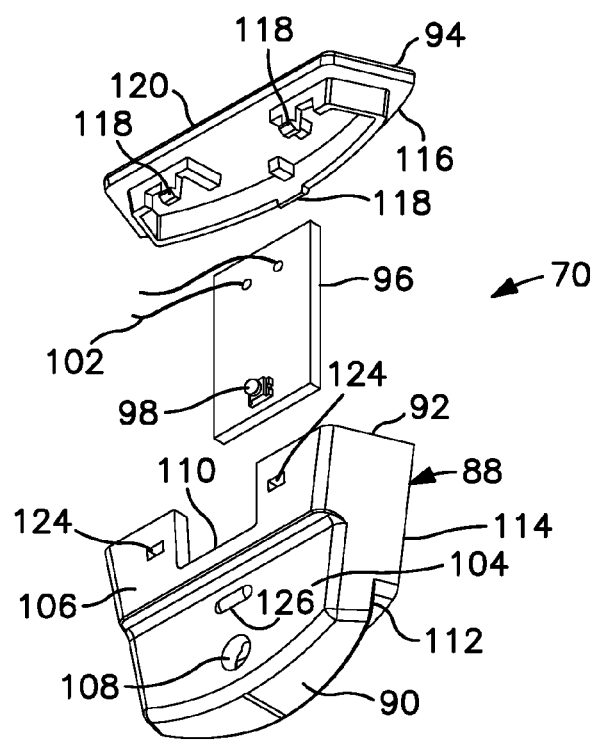

OCCUPANCY SENSOR AND AMBIENT LIGHT CONTROL

CROSS-REFERENCE TO RELATED APPLICATIONS

This application is a divisional application of Ser. No. 12/470,234, filed May 21, 2009.

Related subject matter is disclosed in co-pending U.S. patent application of Jonathan Williams et al, Ser. No. 29/309,182, tiled Jul. 1, 2008, entitled "Occupancy Sensor"; and in co-pending U.S. patent application of Jonathan Williams et al, Ser. No. 11/138,084, filed May 27, 2005 (now issued as U.S. Pat. No. 7,432,690 the entire contents of each of these applications being expressly incorporated herein by reference.

FIELD OF THE INVENTION

The present invention is directed to an occupancy sensor/load controller for sensing the presence of a person in a designated area and for actuating an electrical load or system and, in the case of a lightening fixture load, having the ability to operate the lighting fixture at more than one light level. More particularly, the present invention is directed to a load controller having an occupancy sensor, one or more load control outputs, and a photosensor that is operable in conjunction with an override system removably attached to the controller for selectively signaling the photosensor input of the controller and thereby controlling the operation of the controller.

BACKGROUND OF THE INVENTION

Occupancy sensors are known for sensing occupancy within a designated area and for activating an electrical load or system in response to sensing a person(s) within the designated area. The occupancy sensor can be connected to a load such as a lighting device or system, heating, ventilation and air conditioning (HVAC) system or other electrical system that is intended to be activated only when needed. The sensor device within the occupancy sensor can be an infrared detector and/or an ultrasonic detector, for example, that is capable of detecting when the designated area is occupied by a person or moving object. The occupancy sensor is typically mounted on a wall or ceiling and positioned so that the field of view of the occupancy sensor covers the designated area.

Occupancy sensors are typically used to reduce the energy consumption required for illuminating a target area or otherwise operating an environmental load device such as an HVAC system. The occupancy sensors require reliable activation when the target area is occupied and prevention of false activations when the area is vacant. Various occupancy sensors have been developed with an attempt to improve the reliability of the sensors. One example is disclosed in U.S. Pat. No. 7,411,489 to Elwell et al. which discloses an occupancy sensor that is able to maintain activation when sensing continuing occupancy. The occupancy sensor also includes component settings to enable self-adjusting of the settings. The occupancy sensor is activated upon sensing continuing occupancy and enables separate processing of the settings. An ultrasonic sensor is included to actively sense occupancy and to enable separate processing of the settings. The occupancy sensor is activated when the infrared sensor section senses occupancy and maintains activation when either the infrared sensor or the ultrasonic sensor senses continuing occupancy.

U.S. Pat. No. 6,415,205 to Myron et al. relates to ultrasonic infrared sensors used to produce first and second occupancy estimator signals. The estimator signal is used to switch electrical loads when the estimator signals are above a predetermined threshold. The occupancy sensor is intended to provide high probability of occupancy detection and low probability of false tripping.

Various occupancy sensors have been developed with an attempt to improve the housing of the sensors. For example, U.S. patent publication No. 2007/0229297 to Leonard et al. relates to an occupancy sensor powerbase with a housing in a low voltage wiring terminating unit terminal block. A Power pack in connected to the low voltage terminal block with upper lower portions combined to form an integral power stand alone sensor unit.

Various occupancy sensors have been developed with an attempt to improve the lenses of the sensors. For example, U.S. Pat. No. 6,215,398 to Platner et al. discloses an occupancy sensor with flat lenses for focusing detecting beams into narrow long range beams. The sensing circuit generates a detecting beam that is substantially perpendicular to the lens. The lens has a plurality of lens segments to provide long, intermediate and short range sensing beams. An override timer circuit is provided which upon activation sets the occupancy sensor in occupancy mode for a predetermined period of time.

A number of occupancy sensors are available which have photo sensors for detecting ambient light and selectively disabling an electrical load from being powered on in response to occupancy detection because ambient light conditions are above a selected threshold, thereby reducing energy consumption. For example, U.S. Pat. No. 5,699,243 to Eckel et al discloses a motion sensing system having a photosensor and programmed ambient light level control.

A need exists in the industry for an occupancy sensor to provide fixture override control, that is, selective control of lighting fixture light output and lamp switching. Some current lighting fixtures are equipped with multiple light level option wiring connections. This is sometimes accomplished by having more than one ballast in the fixture. There are also systems that provide multiple inputs to a single ballast to control the light output of the fixture. Either configuration allows the fixture to be operated to offer more light levels than just fully energized and de-energized. For example, it may be desirable to selectively disable or alter the operation of an occupancy sensor that, under normal operating conditions, would suspend activation of an electrical system or lower the light output of a lighting fixture, when ambient light conditions are above a selected threshold. A situation wherein disabling of the photocell operation of an occupancy sensor is desired may be when an occupancy sensor and associated lighting load is located near a skylight. Further, it may be desirable to disable a selected subset of a group of fixtures connected to corresponding occupancy sensors. Thus, a need exists for disabling or altering the operation of the occupancy sensor operating as a load controller to allow the flexibility of overriding the lighting to a higher or lower level than set by the photocell threshold. This would allow the system to respond to load shedding requests or to the desires of the occupants.

In precious products, there was no way to add fixture override control to an existing installation, if the original controller was not purchased with a class II control connector, without replacing the existing controller. It is disadvantageous, however, to provide a connector for fixture override control on the housing of such an occupancy sensor for a number of reasons. For example, such a connector would increase labor because Underwriter Laboratories, Inc. standards require a high potential test between any connector and any Class 1 wire in such an occupancy sensor. An additional wire connector also increases cost of the occupancy sensor, provides another inlet for dust and contaminants to enter the sensor housing, and increases the possibility of wiring mistakes in the field. Further, more SKUs are needed for the sensor family (e.g., sensors with the override connector having different SKUs than sensors without the override connector), adding to the cost and complexity of marketing and inventory management.

A need therefore exists for an override control system for an occupancy sensor that does not require a separate wire connector to the occupancy sensor.

SUMMARY OF THE INVENTION

In accordance with exemplary embodiments of the present invention, an occupancy sensor is provided as a load controller for sensing the presence of a person or object within a designated area and for controllably actuating an electrical load or system. The occupancy sensor includes an override system to allow the occupancy sensor to not energize the electrical load or system or to operate it at a lower power level at selected times (e.g., when sufficient ambient light conditions exist). In accordance with an exemplary embodiment of the present invention, the override system is an independent unit that can be selectively coupled to one or more occupancy sensor without requiring the occupancy sensor to have an extra wire connector for connecting to the override system.

The occupancy sensor, in accordance with illustrative embodiments of the present invention, includes a sensor for detecting the presence of a person or moving object within a target area for activating an electrical load or system such as lighting, ventilation, heating or air conditioning systems. An override system is removably coupled to the occupancy sensor to control and/or override the normal operation of the occupancy sensor. The override system can include an override controller for actuating the override system at selected times and for selected periods of time to control the occupancy sensor.

One aspect of an illustrative embodiment of the present invention is to provide an occupancy sensor as a load controller having a photosensor for detecting daylight or ambient light which is able to turn off or lower the energy consumption of the electrical load or system when the light level within the target area is above a predetermined threshold level. A removable override system can be attached to the occupancy sensor to provide a light source directed toward the photosensor. The override system actuates the light source to project the light source to the light sensor, thereby signaling preventing the occupancy sensor to operate the electrical system at lower power levels at predetermined times, for example.

One aspect of an illustrative embodiment of the present invention is to provide an occupancy sensor as a load controller having a recessed area with an open end facing away from the target area of the occupancy sensor to allow occupancy detection in a field of view below the sensor and light level sensing of the area above the sensor. It may be used to lower the light output of a lighting fixture load, for example, where there is sufficient ambient light available. A removable override unit is fitted into the recess to provide a way to remotely signal the occupancy sensor. In other words, the override unit is connected to a control unit (e.g., a separate or remote control unit) for actuating a light source in the override unit to project light to a light sensor in the occupancy sensor to excite the ambient light detection device in the occupancy sensor (e.g., the light from the removable override unit couples to the light detection device in the occupancy sensor). This allows control of the occupancy sensor behavior without a field wiring connection. This allows an override to a lower fixture power level or to pull power, for example.

A further aspect of an illustrative embodiment of the present invention is to provide an occupancy sensor as a load controller having a photosensor for detecting ambient light and a removable override unit overlying the photosensor of the occupancy sensor. The override unit is connected to a separate control unit which can include a second photosensor positioned at a different location such as a window or skylight for detecting daylight. The photosensor connected to the control unit actuates the override unit when the light level in the area of the second photosensor is above a predetermined level. In one embodiment, the second photosensor and the control unit can be connected to several override units associated with a respective occupancy sensor.

The various aspects of illustrative embodiments of the present invention are basically achieved by providing an occupancy sensor having a housing with a front wall with a sensor device for detecting the presence of a person or moving object in a target area and adapted for controllably actuating an electrical system (e.g., a load such as one or more lighting fixtures configured to operate at several different power levels), a side wall, and a rear wall having a recess. A light sensor is provided in the recess of the rear wall for sensing ambient light directed toward the rear wall. The light sensor is connected to the occupancy sensor for operation of the electrical load at lower power levels when a selected level of ambient light is detected.

The aspects of illustrative embodiments of the invention are also obtained by providing an occupancy sensor assembly comprising a housing having a front wall, a rear wall and a side wall extending between the front wall and the rear wall and an occupancy sensor unit associated with a front wall for sensing the presence of an object and actuating an electrical device in response to a detected object. A light sensor is spaced from the front wall and the occupancy sensor unit. The light sensor is operatively connected to the occupancy sensor unit for detecting ambient light and adapted for controlling the operation of the electrical load at lower power levels, for example, when the ambient light level is above a predetermined level. Users may configure the unit to balance the operation time on multiple outputs or always turn off the same output when the ambient light level is above a predetermined level. An override unit is removably coupled to the housing and has a light source for directing light to the light sensor to simulate ambient light to control the light sensor and the occupancy sensor.

The various aspects of illustrative embodiments of the present invention are further obtained by providing an occupancy sensor assembly having a housing with a front wall, rear wall and a side wall extending between the front and rear wall where the housing is coupled to a luminaire. An occupancy sensor unit is associated with the front wall and adapted for sensing the presence of an object and actuating the luminaire in response to the object being detected. A recess is formed in the rear wall of the housing where the recess has a bottom wall, side wall and an open end facing outwardly from the bottom wall of the housing. A light sensor is positioned in the housing and associated with the side wall of the recess and adapted for detecting ambient light. The light sensor is operatively connected to the occupancy sensor unit and adapted for signaling the occupancy sensor unit. An override unit has a first end received in the recess of the rear wall of the housing and is removably coupled to the housing. The override unit has a light source for directing light to the light sensor to excite the light sensor and signal the occupancy sensor unit.

These and other aspects of the invention will become apparent from the following detailed description of the invention in conjunction with the annexed drawings which disclose one embodiment of the invention.

BRIEF DESCRIPTION OF THE DRAWINGS

These and other objects, advantages and novel features of the present invention will be readily appreciated from the following detailed description when read in conjunction with the accompanying drawings in which:

FIG. 10 is a top perspective view of the override unit of FIG. 7;

FIG. 11 is a bottom perspective view of the override unit of FIG. 7;

FIG. 12 is an exploded bottom perspective view of the override unit of FIG. 7;

Throughout the drawing figures, like reference numerals will be understood to refer to like parts and components.

DETAILED DESCRIPTION OF THE INVENTION

The present invention is directed to an occupancy sensor which can be used alone to control and/or override the operation of an electrical system, or used with a separate override unit to control the operation of the occupancy sensor. The occupancy sensor, in accordance with illustrative embodiments of the present invention, is provided with a light sensor which may be used in conjunction with a separate override unit. The override unit can be connected to the occupancy sensor when desired depending on the requirements for the specific environment. of the installation. The override unit may be added to an installation at a later time without replacing or altering the wiring of the occupancy sensor. The occupancy sensor, in accordance with illustrative embodiments of the present invention, is operatively connected to an electrical system such as a light assembly, fan, alarm system, heating, ventilation and/or air conditioning (HVAC) system or other load and can control the load. The occupancy sensor is able to detect the presence of a person or moving object in the target area and to activate the electrical system (e.g., operation a lighting fixture at a desired power level and keep it energized for a selected period of time after the person or moving object is no longer detected). Typically, the occupancy sensor is programmed to operate the lighting fixture for a selected period of time after motion is no longer detected, after which the occupancy sensor lowers the power level of the electrical system or load to which it is connected to the desired unoccupied operation state (e.g., de-energized completely, or partially for dimming).

Referring to the FIGS. 1-4, the occupancy sensor 10 operating as load controller in one illustrative embodiment of the present invention is connected to an electrical light assembly 12 to controllably actuate light assembly 12. In accordance with an illustrative embodiment, the occupancy sensor 10 is coupled directly to the light assembly 12 by a mechanical connection so as to be fixed to the light assembly 12. In other illustrative embodiments, the occupancy sensor 10 can be separate from the light assembly 12 and connected by wires, cables, an electrical conduit, or wireless connection such as a 900 MHz radio frequency (RF) solution or a line of sight infrared (IR) communication link.

Figure 1:
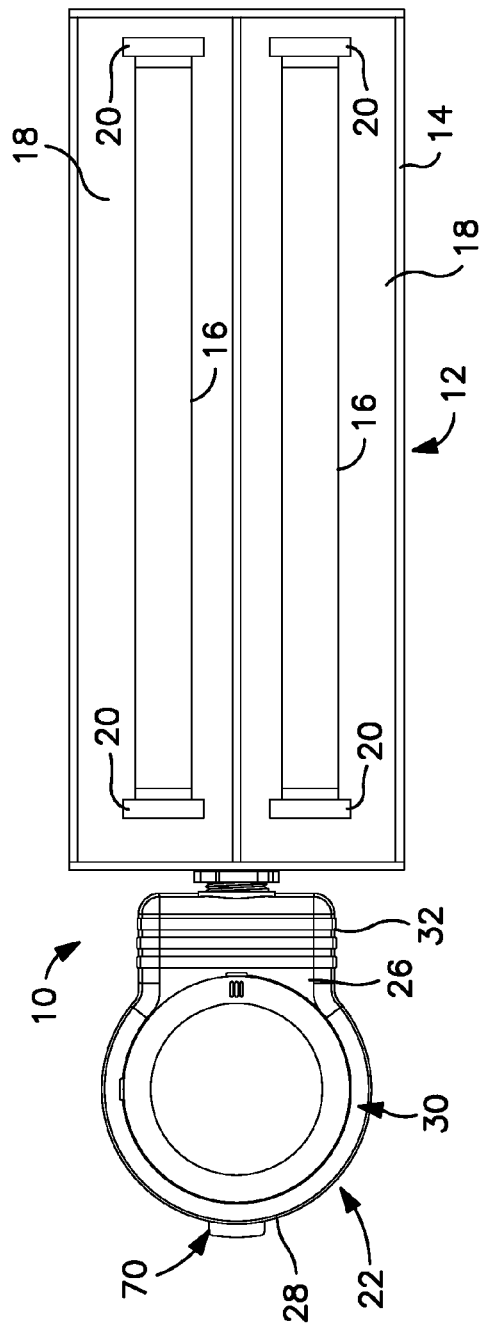
FIG. 1 is a bottom view of an occupancy sensor and lamp assembly comprising an occupancy sensor constructed in accordance with an illustrative embodiment of the present invention and at least one lamp.
Figure 2:
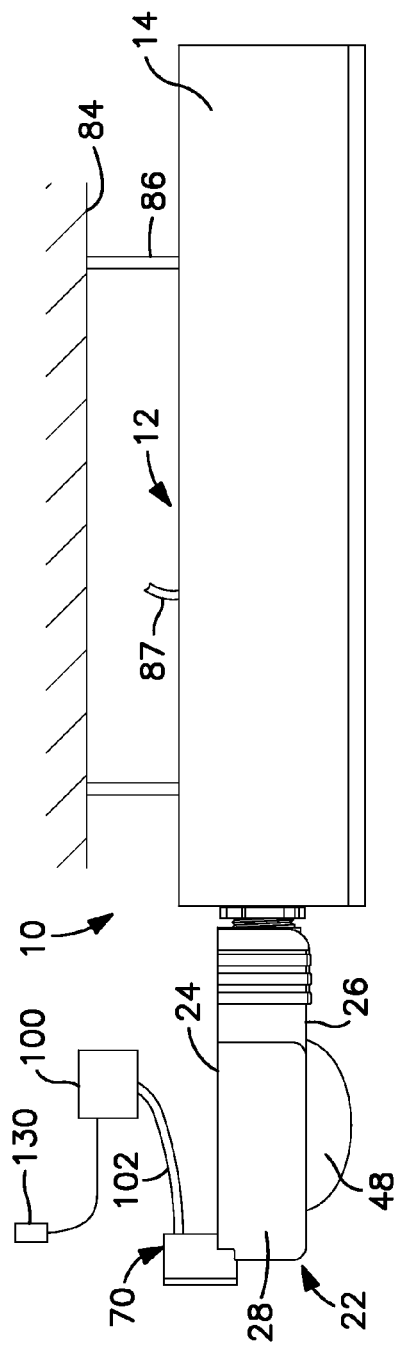
FIG. 2 is a side elevational view of the occupancy sensor and lamp assembly of FIG. 1.

In the embodiment shown in the FIGS 1 and 2, light assembly 12 has a housing 14 supporting two lamps 16. Lamps 16 can be fluorescent lamps as shown, high intensity lamps, LED or other suitable lamp designs. Housing 14 could contain more than two lamps (e.g., with the lamps sharing or having independent ballastry or lamp drivers) to allow operation of the fixture at more than one light level. Housing 14 in the illustrative embodiment has a rectangular shape with a reflector 18 corresponding to each lamp 16. Lamps 16 are connected to lamp bases 20 for supplying electrical power to the lamps. As shown, lamps 16 are straight fluorescent tubes, although other shape, and sizes and types of lamps can be used. Housing 14 has opening at one end (not shown) for coupling to the occupancy sensor 10 and for receiving control wires from occupancy sensor 10. Light assembly 12 is connected to a suitable power source in a conventional manner.

Figure 3:
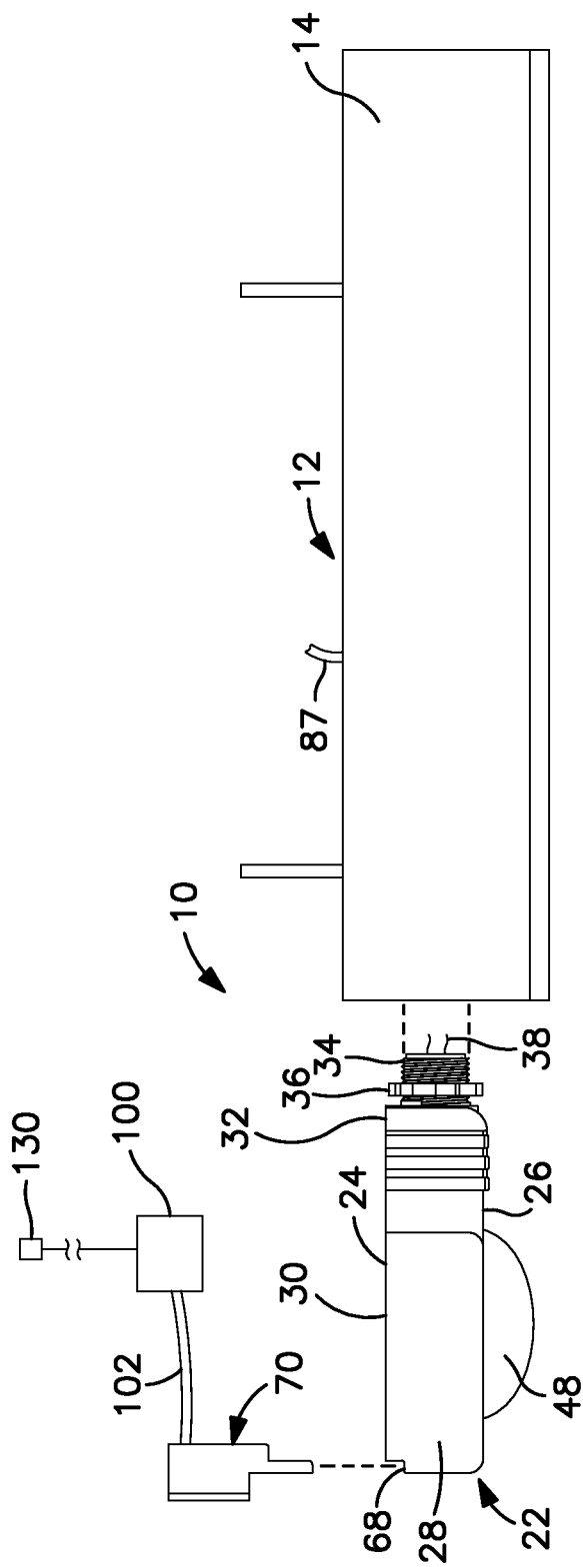
FIG. 3 is an exploded elevational side view of the occupancy sensor and lamp assembly of FIG. 1.
Figure 4:
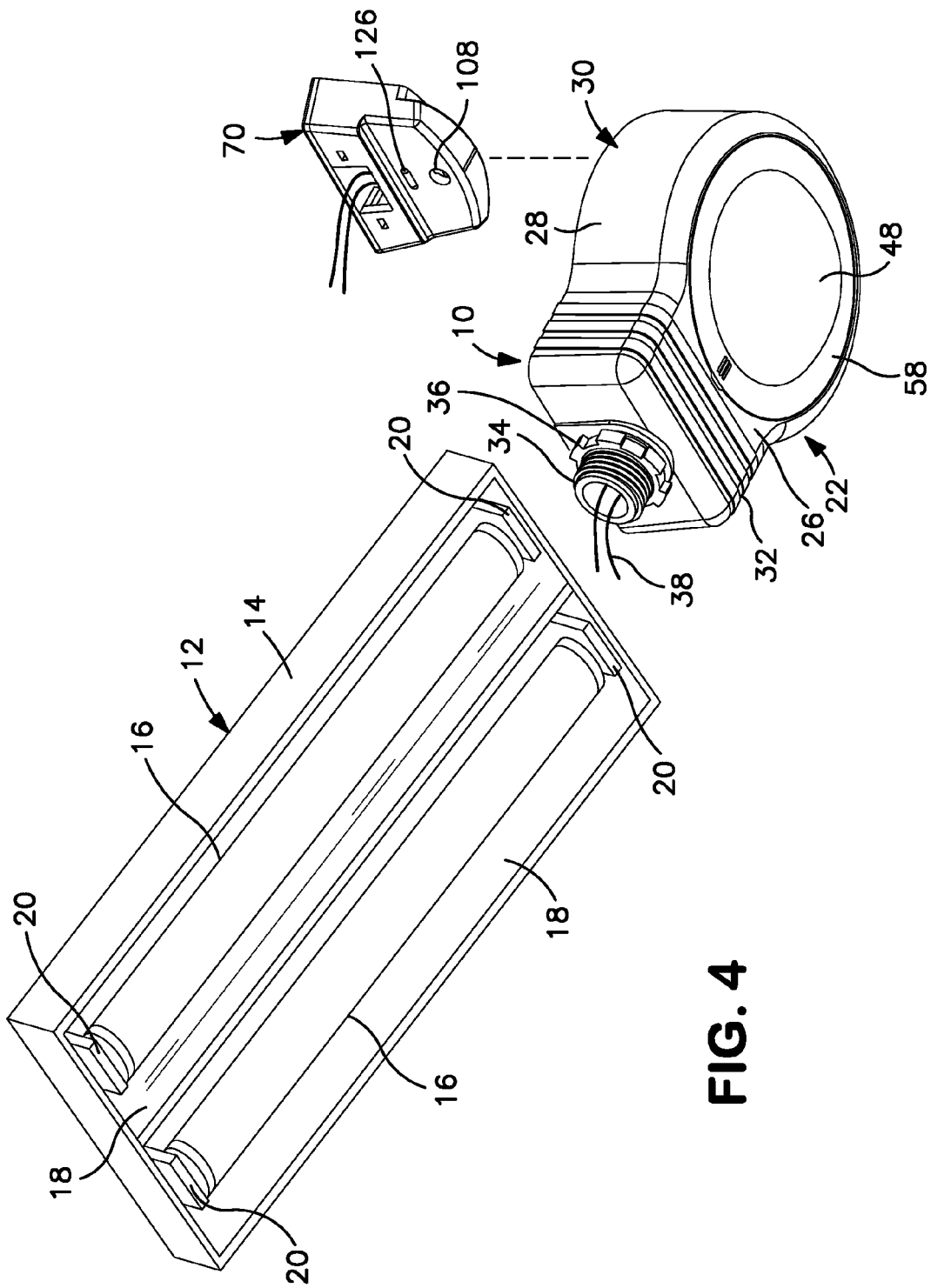
FIG. 4 is an exploded bottom perspective view of the occupancy sensor and lamp assembly of FIG 1.

Occupancy sensor 10 includes an override unit 70 that is removably coupled to occupancy sensor 10 as illustrated in FIG. 2 and FIG. 3. Occupancy sensor 10 includes a housing 22 having a rear wall 24, a front wall 26 and a side wall 28. In the embodiment illustrated, the front wall 26 defines a front side that typically faces the target area and is visible to the occupants. The rear wall 24 defines a top side that typically faces away from the target area. Side wall 28 extends from rear wall 24 to front wall 26. In the illustrative embodiments of the present invention shown in the drawings, the rear wall 24 is typically oriented to face upwardly toward the ceiling of a room and the front wall 26 is typically oriented to face in a generally downward direction toward the room and the area to be occupied and illuminated by the light assembly 12.

Figure 9:
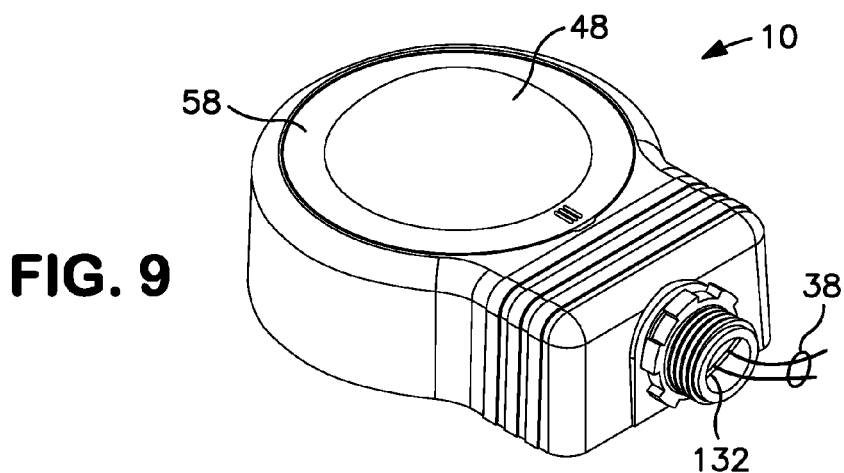
FIG. 9 is a bottom perspective view of the occupancy sensor of FIG. 5.

As shown in FIG. 1, rear wall 24 and side wall 28 of housing 22 have a substantially circular portion 30 and straight portion 32. Straight portion 32 has threaded coupling 34 for coupling with housing 14 of light assembly 12. For example, a threaded lock nut 36 is threaded on to the threaded coupling 34 for locking the occupancy sensor 12 to the light assembly 14. In one illustrative embodiment, the threaded coupling 34 is inserted through an opening in the housing 14 of light assembly 12 and threaded nut (not shown) is threaded on to the end of threaded coupling 34 inside the housing 14. Lock nut 36 is then tightened against the outer surface of the housing 14 to secure the occupancy sensor 10 to the light assembly 12. Threaded coupling 34 defines a conduit for supplying electrical wires 38 from occupancy sensor 10 to the light assembly 12 for operating the light assembly 12 as discussed hereinafter in greater detail. In one embodiment, coupling 34 has a strain relief member (e.g., a cross-support member 132 shown in FIG. 9) extending transversely across the passage of the coupling to prevent damage to the wires and electrical components in the occupancy sensor.

Figure 6:
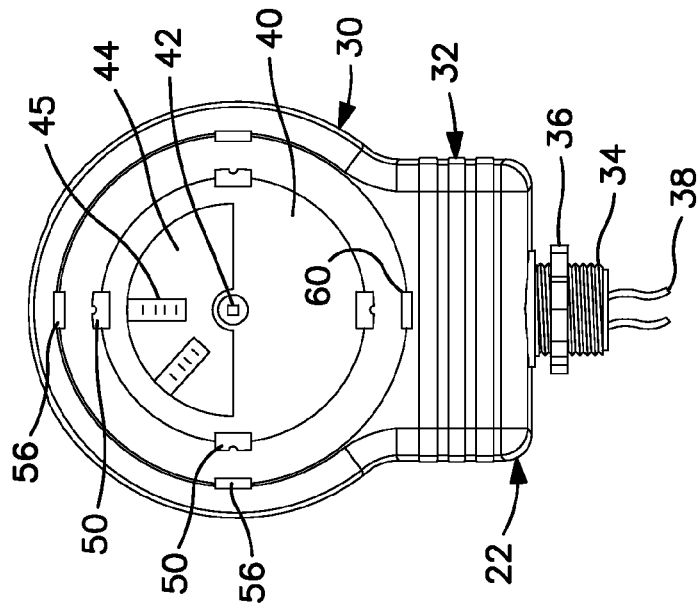
FIG. 6 is a bottom view of the occupancy sensor of FIG. 5 with the lens removed.
Figure 5:
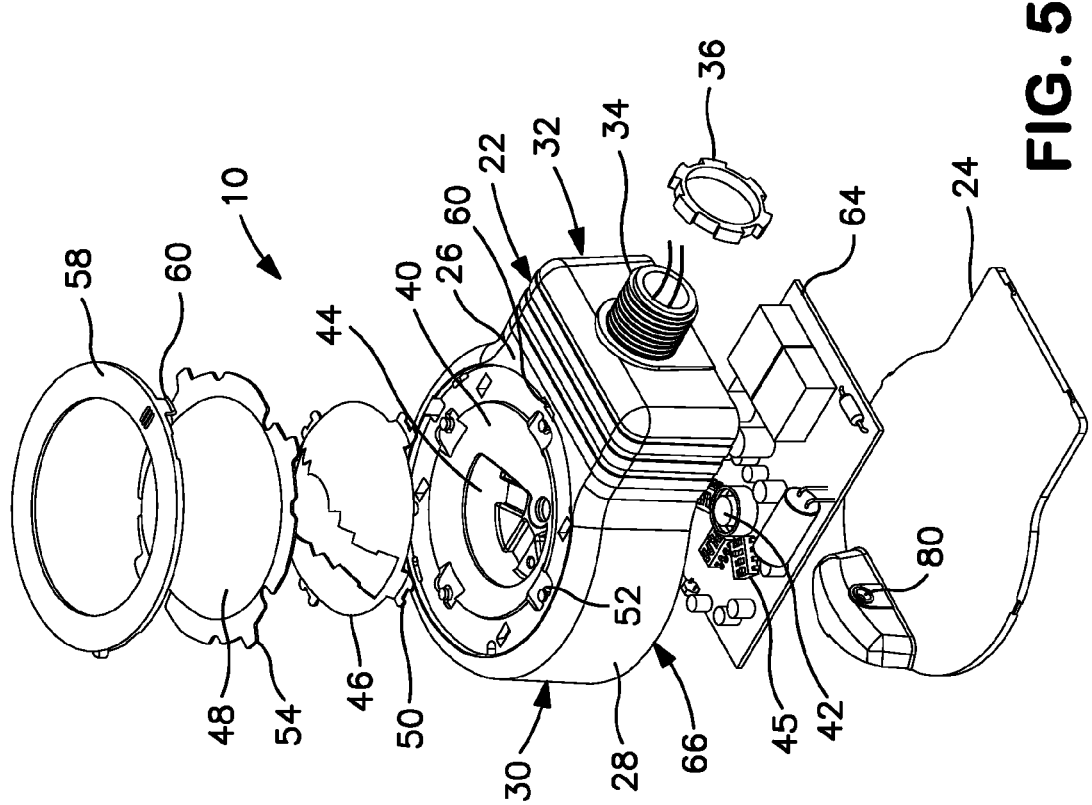
FIG. 5 is an exploded bottom perspective view of the occupancy sensor constructed in accordance with an illustrative embodiment of the present invention.

Referring to FIGS. 5 and 6, front wall 26 of occupancy sensor 10 has a substantially frustoconical shaped recess 40. A sensor unit 42 is positioned in the bottom of recess 40 in preferably substantially the center of the circular portion 30 of housing 22. Sensor unit 42 can be an infrared sensor for passively detecting the presence of a person or moving object, an ultrasonic sensor, or other sensing device as known in the art to detect the presence of a person or object or movement of a person or object within a field of view of the sensor unit 42. Occupancy sensor 10 can include more than one type of sensor depending on the requirements for the assembly and the intended environment of use. By way of an example, the occupancy sensor 10 can be a Fluorescent High Bay occupancy sensor, model WASP, commercially available from Hubbell Building Automation, Inc., Austin, Tex.

As shown in FIGS. 5 and 6, frustoconical recessed portion 40 has at least one pocket area 44 for providing access to a plurality of DIP switches 45 which can be set manually to control the operation of the occupancy sensor 10. DIP switches are provided for setting the time out periods for de-activating the lights 12 after the occupancy sensor 10 no longer detects a person the target area, selecting a sensitivity setting(s) for the sensor(s) 42, selecting the behavior of multiple output units to either balance time of operation between the outputs or always de-energize one first, selecting whether outputs will be allowed to activate off the same timer or separate timers, and other functions of the occupancy sensor 10 as known in the art.

Housing 22 of occupancy sensor 10 has a the optional mask 46 and a Fresnel lens 48. Lens 48 and mask 46 have a semi-spherical shape forming a dome extending outwardly from the face of front wall 26. As shown in FIG. 2, lens 48 and mask 46 face in a downward direction toward the target area of the occupancy sensor 10. Mask 46 includes tabs 50 which are inserted under tabs 52 on front wall 26 to couple and position the mask 46 in a position aligned with the sensor unit 42 and oriented to selectively block facets of the Fresnel lens 48. Lens 48 includes tabs 54 that are inserted into open slots 56 for coupling the lens in a selected position aligned with the mask 46 and sensor unit 42 that corresponds to the focal length of the Fresnel facets of lens 48 and the position of the detector. The sensor may be used without the mask 46 if the full lens coverage is desired. A complete mask can also be shipped with the unit for a custom mask to be fabricated as needed.

A snap ring 58 is provided to fit over the planar portion of the lens 48. Snap ring 58 has a plurality of prongs 60 extending perpendicular to the plane of ring 58 which are inserted into slots 62 in the front wall 26 of housing 22. Prongs 60 preferably have an inclined or angle outer end for inserting into the respective slot and a hook portion for coupling with an inner edge of the slot to couple the ring to the housing and hold the lens and diffuser in position on the housing 22. In the embodiment shown, front wall 26 of housing 22 has a flat recessed area surrounding the frustoconical recess 44 to enable ring 58 to fit neatly onto housing and lie flush with the surface of front wall 26 of housing 22.

Housing 22 of occupancy sensor 10 encloses the electrical components for detecting the presence of a person and/or detecting motion of a person or object within a target area and controlling a load or signaling a load controller. The electrical components comprise a printed circuit board 64 as shown in FIG. 5 which supports the sensor unit 42, the DIP switches 45, and other circuit components such as a processing device (e.g., a programmable processing device such as a microcontroller and associated memory if needed, an application-specific integrated circuit, and so on), and one or more relays for connecting the occupancy sensor to the load(s). The processing device is connected to the DIP switched 45, the occupancy sensor unit 42 and a ambient light sensor 82 described below, and has an optional serial input. The processing device is configured to control the relay(s) in accordance with inputs from these components to achieve selected operating states of the load(s) connected via the relays(s). For example, the load can be lighting assembly having at least two lamps A and B and the occupancy sensor configured for selected operation in an occupied state using a lamp A, lamp B, both lamps or neither lamp and in an unoccupied state using always one of the lamps A or B and intelligently cycling the lamps for substantially equal burn times.

With further reference to FIG. 5, rear wall 24 is attached to side wall 28 and typically supports circuit board 64. In the illustrative embodiment shown, front wall 26 and side wall 28 are preferably integrally formed as a one-piece unit of housing 22. Side wall 28 has an open end 66 which is closed by rear wall 24. Rear wall 24 has a substantially flat planar configuration with a shape and dimension corresponding to the shape and dimension of side wall 28. In the illustrative embodiment shown in FIG. 7, rear wall 24 has outwardly extending tabs 68 which are received in a respective recess formed on the inner face of side wall 28 so that rear wall 24 snaps into side wall 28.

Figure 7:
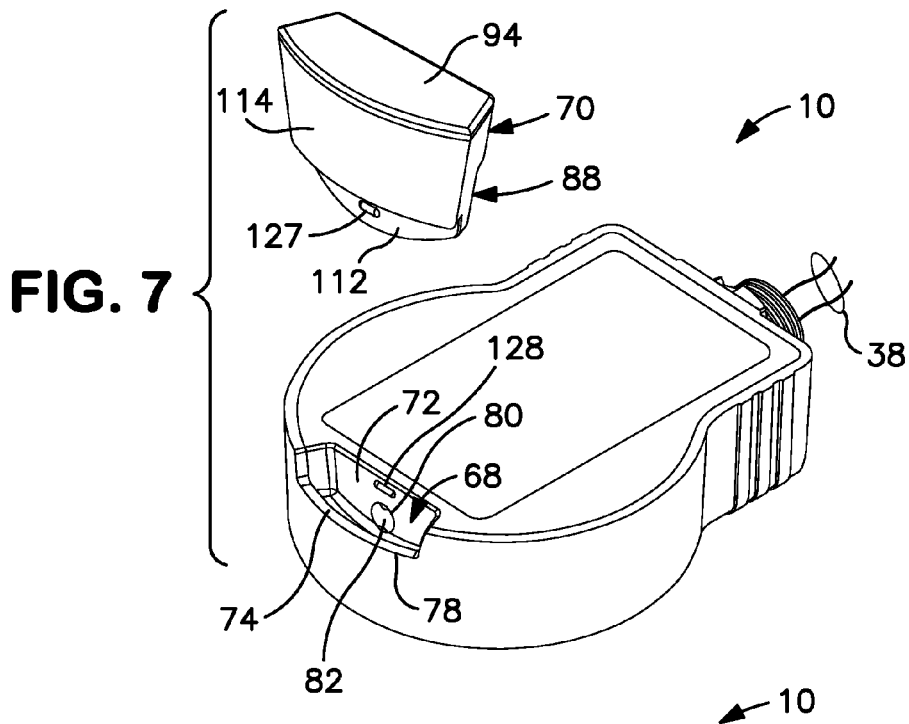
FIG. 7 is a top perspective view of the occupancy sensor of FIG. 5 showing an override unit constructed in accordance with an illustrative embodiment of the present invention.
Figure 8:
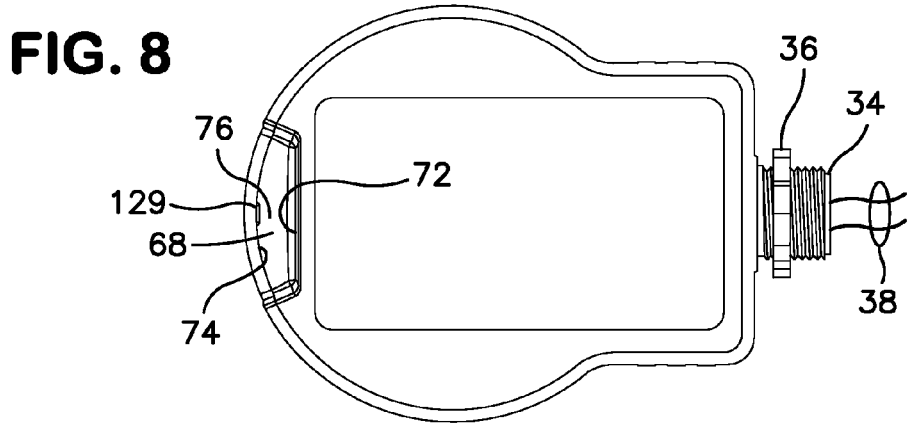
FIG. 8 is a top view of the occupancy sensor of FIG. 5 with the override unit removed.

Referring to FIGS. 5 and 7, rear wall 24 has a recessed area 68 defining an open cavity or port for receiving an occupancy sensor override unit 70. Cavity 68 is positioned in the circular portion 30 of housing 22 opposite the threaded coupling 34. Cavity 68 opens outwardly with respect to rear wall 24 in a substantially upward direction with respect to the normal orientation of the occupancy sensor 10 and light assembly 12 during use. Cavity 68 includes an inner wall 72, an outer wall 74 and a bottom wall 76. Outer wall 74 is defined by side wall 28 of housing 22 when the rear wall 24 is frictionally engaged within the contour of the side wall 28 of the housing 22. Outer wall 74 has a notched portion 78 aligned with cavity 68. As shown in FIG. 7, inner wall 72 of cavity 68 has an opening 80 aligned with a light sensor 82 mounted within housing 22. Light sensor 82 is connected to circuit board 64 for sensing light levels in the target area and providing this information to the occupancy sensor operating as load controller according to the measured light level. In the embodiment shown, the light sensor 82 is positioned in the cavity and faces outwardly toward side wall 28 with respect to housing 22. Light sensor 82 is oriented to be able to detect light levels above occupancy sensor 10 in the direction in which daylight or ambient light is normally directed toward the target area from skylights.

Occupancy sensor 10 and light assembly 12 are mounted in a selected position above a target area to be illuminated by light assembly 12. Typically, the target area is directly below the occupancy detector and light assembly. Occupancy sensor 10 has a field of view that is adjusted to a desired position or location that can overlap with the target area or be different from the target area. As shown in FIG. 2, light assembly 12 is mounted to the ceiling 84 or other structure by supports 86. Occupancy sensor 10 is attached directly to and supported by light assembly 12. A power supply cord 87 is connected to light assembly 12 for providing power the lamps and the occupancy sensor 10.

Occupancy sensor 10 is focused downwardly by suitable adjusting means as known in the art to detect motion of a person or object and/or the presence of a person in the target area and/or in the field of view of the occupancy sensor 10. In normal operation, occupancy sensor 10 is connected to light assembly 12 to activate the light assembly (e.g., to a user selected level) when a person is detected in the target area and to maintain the activation of the light assembly for a predetermined period of time after the last detected occurrence of occupancy. DIP switches 45 in occupancy sensor 10 are able to adjust the time out periods after which the lights in the assembly are de-activated, for example. Also, for example, users may configure the occupancy sensor 10 to balance the operation time on multiple outputs or always turn off the same output when the ambient light level is above a predetermined level.

Light sensor 82 detects the ambient light level in the area and signals the occupancy sensor 10 or otherwise changes its operation to not fully energize all or part of the light assembly 12 when the light level is above a predetermined level. When the light level in the target area falls below a threshold level, occupancy sensor 10 is signaled to control the operation of and energize at a higher level the light assembly 12 or other electrical system when the sensor unit 42 is in an occupied state. More specifically, the override unit independently, or in response to a control unit (e.g., a separate or remote control unit), actuates a light source 82 in the override unit 70 to project light to a light sensor in the occupancy sensor 10 to excite the ambient light detection device in the occupancy sensor (e.g., the light from the removable override unit couples to the light detection device in the occupancy sensor). This allows control of the occupancy sensor behavior without a field wiring connection. This allows an override to a lower fixture power level or to full power, for example. Further, the override unit 70 and the occupancy sensor 10 can be configured such that the override unit 70 can selectively pulse the light source 98 on and off to signal to the occupancy sensor 70 via its light sensor 82 that it should turn off, or to turn on, or to dim the lighting fixture and then to change to another one of the off, on or dim states when the pulsed signal is subsequently received from the override unit 70.

Occupancy sensor 10 is preferably coupled to a light assembly 12 mounted to a support 84 as needed such that the occupancy sensor 10 is oriented to direct light sensor 82 toward a skylight or window or other source of ambient light. In this manner, light sensor 42 is able to detect the light level and signal or otherwise change operation of the occupancy sensor 10 when the light level is sufficient to avoid the need to active the light assembly 12.

Override unit 70 as shown in FIGS. 10-12 includes a body 88 with a bottom end 90 and an open top end 92. Body 88 can be made of a clear plastic material to allow ambient light to pass through to light sensor 82. Thus, adjustment of the photosensor trip point can be performed remotely and often without requiring a user to use a lift or ladder to reach an occupancy sensor 10. In this manner, override unit 70 can be coupled to occupancy sensor 10 with light sensor 82 still being able to detect ambient light in the area. Alternatively, body 88 can be made of an opaque plastic material that does not allow light to pass through. Body 88 of override unit 70 has a shape complementing the cavity 68 of occupancy sensor housing 22. An end wall 94 snaps into the open end 92 of body 88 to close body 88. A circuit board 96 is positioned within body 88. Circuit board 96 includes an LED 98 or other light source and is connected to a control unit 100 by wires 102. Alternatively, the circuit board 96 can include components for wireless communication with the control unit 100. Control unit 100 can also include components for wireless communication and connect to circuit board 96.

Bottom end 90 of override unit 70 has a substantially flat inner face 104 with a stepped portion 106. Inner face 98 has a window 108 aligned with LED 98 on circuit board 96 so that LED 98 is able to project light outwardly through window 108. The stepped portion 106 has a notched portion defining a window 110 for wires 102. Override unit 70 has an outer face 112 with a curved shaped corresponding substantially to the curvature of side wall 28 of housing 22. Outer face 112 has a stepped portion 114 spaced from the bottom end. End wall 94 has a curved edge 116 corresponding to the shape of the outer face 112 with a hook member 118 and a straight edge 120 corresponding to the shape of inner face 98 of body 88 of override unit 70. A pair of hooks 122 extends from the face of end wall 94 for coupling with a respective aperture 124 in stepped portion 106 of inner face 98 for coupling end wall 94 to body 88.

Override unit 70 is connected to control unit 100 by wires 102 for supplying electrical power to LED 98 and for actuating LED 98 at selected times and for selected periods of time. Override unit 70 may also be connected wirelessly to the control unit 100. Override unit 70 is inserted into cavity 68 in bottom wall 26 of housing 22 with window 108 and LED 98 aligned with aperture 80 and light sensor 82. As shown in FIG. 7, inner face 104 and outer face 112 of body 88 have a shape and dimension complementing the shape and dimensions of cavity 68. Inner face 104 of body is provided with a coupling member for coupling override unit 70 to housing 22. In the illustrative embodiment shown, the coupling member is a detent 126 extending outwardly from the inner face 104 which is received in a complementing recess 128 in inner wall 72 of cavity 68. Preferably outer face 112 of body 88 includes a detent 127 which is received in a corresponding recess 129 in outer wall 74 of cavity. In this manner, override unit 70 can be removeably and frictionally attached to occupancy sensor 10 as desired and removed if not needed.

Override unit 70 is operated by control unit 100 which is programmed to activate an illuminate LED 98 at selected times and for selected lengths of time according to the working environment. Control unit 100 in one illustrative embodiment is connected to a light sensor (e.g., sensor 130 in FIG. 3) which can be positioned a location spaced from occupancy sensor 10 to detect ambient light. Control unit 100 and a light sensor 130 can be connected via wired or wireless connection. In one embodiment, light sensor 130 is positioned near a sky light to provide an accurate measurement of the light available in the target area. Light sensor 130 is connected to control unit 100 to indicate that a sufficient threshold light level is present. When a threshold light level is detected by light sensor 130, control unit 100 actuates LED 98 to direct light to the light sensor 82 of occupancy sensor 10. Light sensor 82 of occupancy sensor 10 then produces a signal to prevent occupancy sensor 10 from activating all or part of light assembly 12, depending on the light level desired. Control unit 100 can be programmed to activate LED 98 at selected periods of time and for specified lengths of time to override normal the operation and normal function of occupancy sensor 10. The override units 70 of multiple corresponding occupancy sensors 10 allow the occupancy sensors 10 to be controlled together via the control unit 100. The control unit 100 can be separate or remote from one or more override units 70 in accordance with an illustrative embodiment of the present invention. One photosensor can be placed in a skylight or other optimal location and wired or otherwise connected to a plurality of override units 70. The control unit can, in turn, switch the override units 70 and their occupancy sensors 10 together based on a light level measured at an optimal location by the photosensor.

In the illustrative embodiment shown, control unit 100 is operatively connected to one override unit 70 for overriding the operation of a single occupancy sensor. In other illustrative embodiments, control unit 100 is operatively connected to a plurality of override units for controlling the operation of a plurality of occupancy sensors 70. The control unit 100 can operate each of the override units 70 individually to selectively override the operation of one or more selected occupancy sensors 10 and their associated light assemblies 12. Preferably, override units 70 and control unit 100 are separate from the occupancy sensor 10 to provide versatile use of the occupancy sensor 10 without the need to program the occupancy sensor 10 for each use. The override units 70 can be coupled to the occupancy sensors 10 as needed and are connected to the control unit 100. Accordingly, information can be provided to the sensor 10. For example, time out and/or dimming modes can be set to different configurations (e.g., different settings for different times of day or different activities in the target area such as cleaning crew operation timers. Fixtures 12 can be selectively switched on depending on what group(s) they belong to. For example, one-half of the fixtures in a selected area can be turned off or operated at a lower power level via a control unit 100 and associated override units 70 during a high energy demand time or other selected time or situation. Alternatively, control signals from an override unit 70 can be provided to an occupancy sensor 10 comprising at least two relays for controlling respective loads to control one, the other or both relays as needed. Selected occupancy sensors can be placed into a test mode via their respective override units 70 and a common control unit 100.

In addition, as described in more detail below, override units 70 and a control unit 100 can be configured to provide enable/disable smart cycling. A single control unit 100 is able to be programmed to operate one or more occupancy sensors 10 simultaneously without the need to program each of the occupancy sensors. In addition, control unit 100 is able to control the LED individually for several occupancy sensors and their corresponding light assemblies. In one illustrative embodiment of the present invention, control unit 100 selectively activates the LED of several override units 70 at selected times to control the operation of each light assembly 12 independently of each other. In this manner, the control unit 100 is able to control and override the operation of various light assemblies 12 in different locations independently of each other via their respective motion sensors. The control unit 100 can include a timer or other means for determining a time out period so that, when the occupancy sensor 10 no longer senses a person or moving object in the target area, the occupancy sensor 10 can de-active the light 12 after a selected period of time to reduce unnecessary energy consumption after the detected occupant has exited the target area. In one illustrative embodiment, the control unit 100 can de-activate one or more of the light assemblies 12 via their corresponding occupancy sensors 10 when the presence of a person is no longer detected, while maintaining one or more other light assemblies 12 in a working mode for an additional selected period of time. The occupancy sensor/control unit 10 is able to record which of the loads remained energized during the previous cycle and switch the operation of the lamps in the light assemblies 12 to ensure that each of the lamps in the light assemblies 12 exhibits a similar burn time, thereby preventing one or more lamps from burning out prematurely. his behavior may be enabled or disabled with the DIP switches 45.

Figure 13:
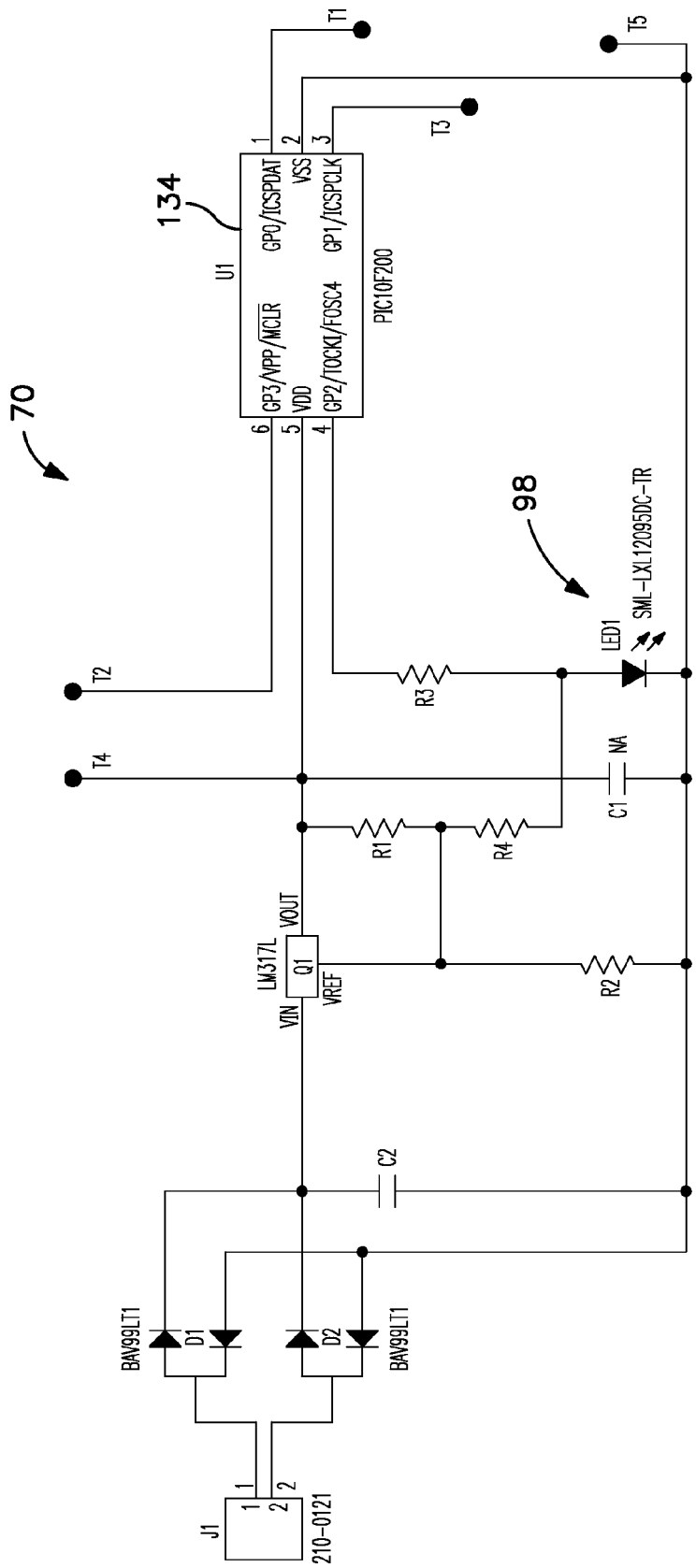
FIGS. 13-17 are schematic wiring diagrams of an override unit constructed in accordance with respective illustrative embodiments of the present invention.

FIGS. 13-17 are circuit diagrams of respective illustrative embodiments of an override unit 70. With reference to FIG. 13, dual diodes D1 and D2 form a full wave bridge that feeds capacitor C2. Regulator Q1 operates as a linear voltage regulator providing power to microcontroller 134 (U1). Microcontroller 134 controls the current through LED 98 (LED1). The microcontroller 134 can modulate the current to provide a message to the occupancy sensor as exemplified above in connection with the selective pulsing on and off of the light source LED 98. Microcontroller 134 can have a RF wireless transceiver as described below in connection with FIG. 17.

Figure 14:
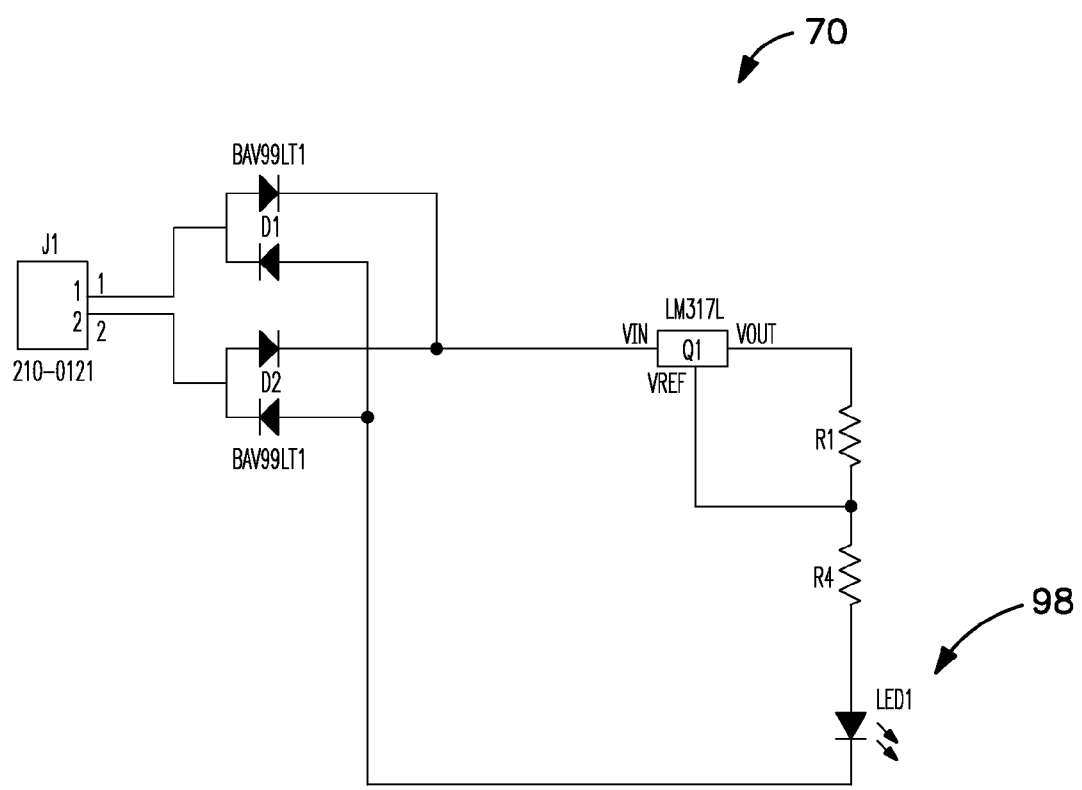

FIG. 14 is another configuration of an override unit 70 that omits a processor and is therefore simpler and less costly. Dual diodes D1 and D2 form a full wave bridge that feeds capacitor C2. Regulator Q1 operates as a constant current regulator, providing power to LED 98 (LED1).

Figure 15:
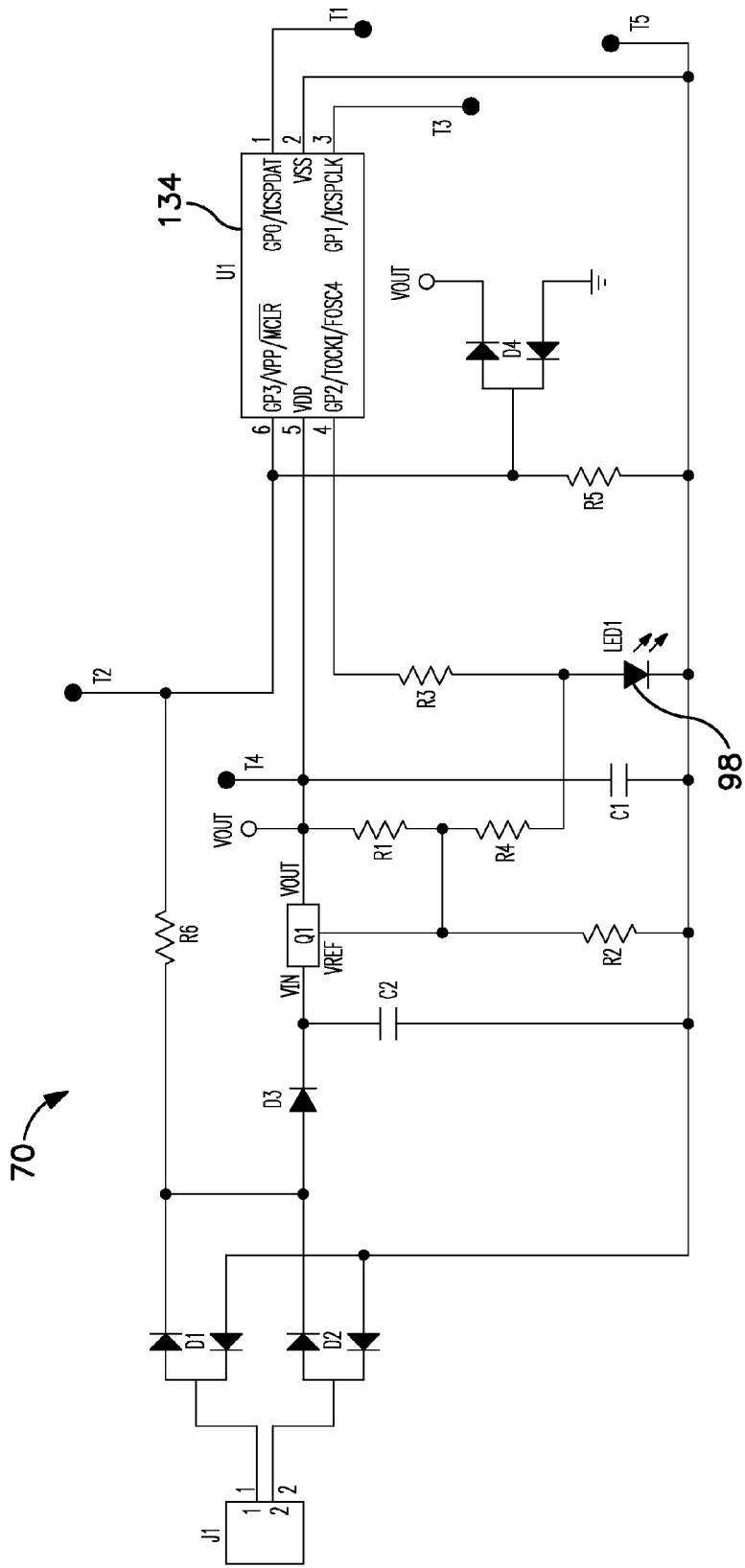
Figure 16:
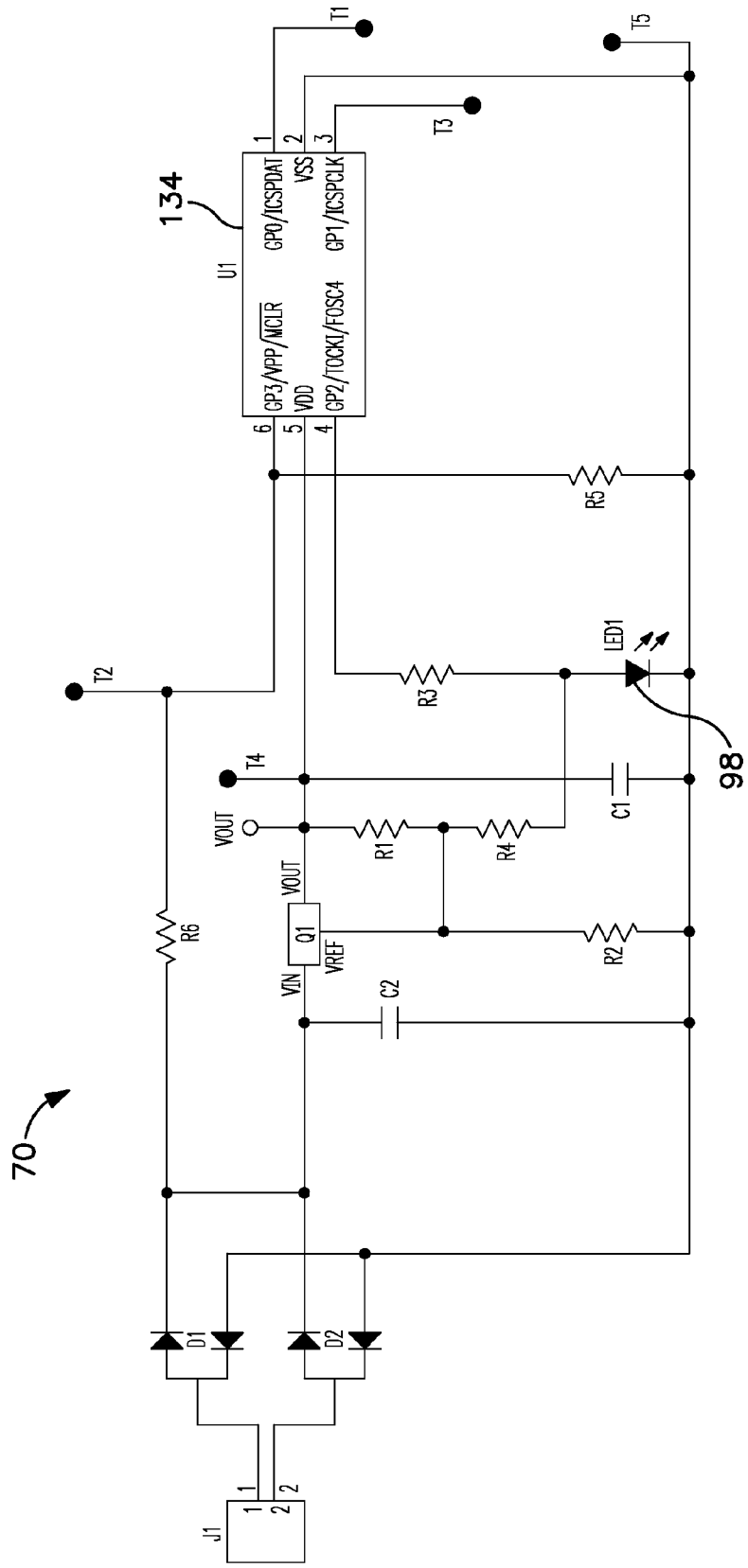

FIGS. 15 and 16 each depict an override unit 70 having an additional connection for the microcontroller 134 to a power source through resistor R6. In FIG. 15, diode D3 separates capacitor C2 in one direction from this sensed node(T2). Resistor R5 and dual diode D4 scale and limit the voltage sensed through resistor R6 at the anode of diode D3. The voltage sensed at T2 can be used to monitor the input power source to detect the loss or degradation of input power. This information can be used to signal or indicate to the occupancy sensor 10 that the override unit 70 has lost power and that the sensor 10 should terminate any override function and return to normal operation. In FIG. 15, diode D3 allows for the detection of pulses in the form of short disturbances on the power source that are meant to transmit a signal to the microcontroller 134 as described in the example above. This provides a very inexpensive means to communicate with the microcontroller 134.

FIG. 16 depicts another implementation of an override unit having a connection for the detection of loss of input power. The override unit 70 in FIG. 16, however, does not have diode D3. Thus, capacitor C2 filters any pulses or signals on the input power source that might be intended for communications.

Figure 17:
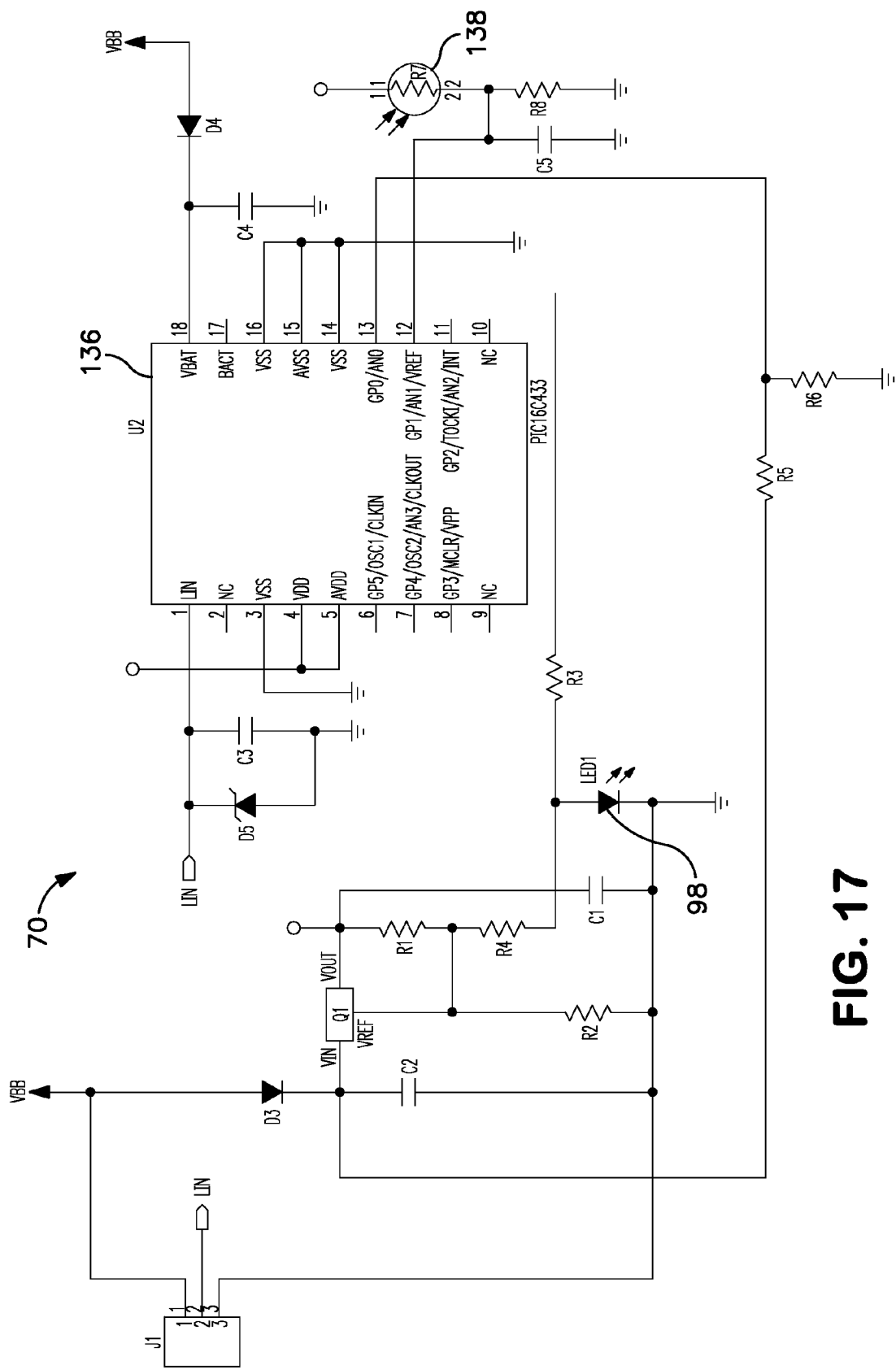

FIG. 17 shows an illustrative configuration of an override unit 70 taking advantage of a microcontroller 136 used in conjunction with or provided on chip transceiver. This implementation utilizes, for example, the LIN bus protocol for communications between a power source and plural connected override units 70. In the implementation shown in FIG. 17, there are preferably nor more than 10 override units 70 connected to one power source; therefore, the LIN protocol can be used. FIG. 17 shows a connection of the microcontroller 136 to a light sensor 138(R7). Resistor R8 and capacitor C5 filter and bias the light sensor 138 (R7). Resistor R8 and capacitor C5 filter and bias the light sensor 138 (R7) for the microcontroller 136 to measure the light on sensor R7. This light level information can be used by the microcontroller 136 for the control of the output LED 98 (LED1) used to signal the occupancy sensor 10. This light level information can also be sent back to the power source over the LIN bus (LIN). The two-way communications allow for the override unit 70 to provide information (e.g., usually only upon request) about the operation of the lamps and ambient light in the space and allow the override unit 70 to be commanded into different modes of operation. An override unit 70 can, for example, provide information such as the number of minutes that it had commanded a lighting fixture to run in a reduced power mode, the average light level in the space, or request permission to lower the power of a system if the light level was sufficient.

In another illustrative embodiment of the present invention shown in FIG. 18, a U-shaped override unit 150 can be provided to snap in (i.e., to an occupancy sensor 10) with an internal light pipe to aim downward on ambient light from below occupancy sensor to the light sensor 82.

Figure 18:
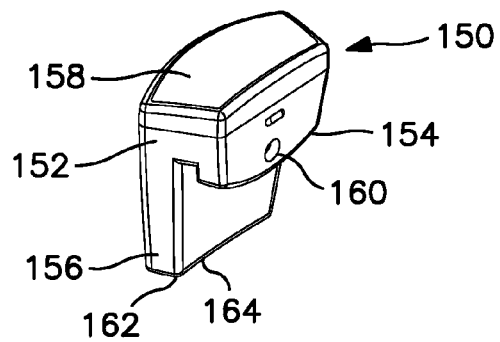
FIG. 18 is a perspective view of the override unit constructed in accordance with an illustrative embodiment of the present invention.
Figure 19:
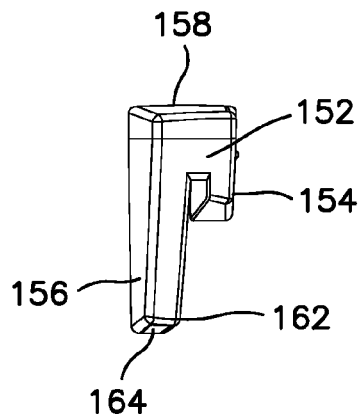
FIG. 19 is a side view of override unit of FIG. 18.
Figure 20:
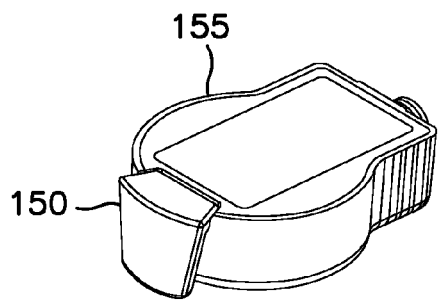
FIG. 20 is a top perspective view of the override unit of FIG. 18 coupled to the occupancy sensor.

As shown in FIGS. 18-20, override unit 150 has a substantially U-shape with a body portion 152 with a first downwardly leg 154 and a second downwardly extending leg 156 extending substantially parallel to first leg 154. The upwardly facing surface of body portion 152 is provided with a lens 158 or opening to allow ambient light from above the system to enter override unit 150 and be directed through override unit 150 to an opening 160 in first leg 154. In one embodiment a light pipe or reflective inner surface can be provided in the interior of override unit 150 to direct the ambient light to the opening 160 in first leg 154. The ambient light from above the system is then directed to the light sensor of the occupancy sensor to control the operation and functions of the occupancy sensor. First leg 154 snaps into the recess or pocket of the occupancy sensor 155 as shown in FIG. 20 in a manner of the previous embodiment. Occupancy sensor 155 is substantially the same as in the embodiment of FIGS. 1-12.

In the embodiment shown, second leg 156 has a length greater than the length of first leg 154. Preferably second leg 156 has a length to extend past the bottom surface of the occupancy sensor 155 so that the longitudinal end 162 of second leg 156 is spaced downwardly from the outer surface of the occupancy sensor. The end 162 of second leg 156 can also include a lens 164 or an opening to allow ambient light from below the occupancy sensor to enter override unit 150 and be directed to the opening 160 in first leg 154 where the light is directed to the light sensor of the occupancy sensor 155. A light pipe or inner reflective surface can be provided within the second leg and override unit 150 to direct the ambient light from below the system to the light sensor of the occupancy sensor 155. The light pipe is in communication with the lens 164 to receive the light directly from the lens and direct the ambient light to the light sensor of the occupancy sensor 155. The ambient light can be carried to the occupancy sensor by internal reflective surfaces within the override unit, a light pipe 155 or a combination of reflective surfaces and a light pipe. Override unit 150 includes a circuit board and LED in the same manner as the previous embodiment and functions in the same manner to control the function of the occupancy sensor by directing light to the light sensor of the occupancy sensor 155.

The override unit 150 is able to transmit ambient light from above and below the occupancy sensor to the occupancy sensor to control the operation of the occupancy sensor 155. In the embodiment of FIGS. 18-20, a lens is provided in the top surface of the body 152 and in the bottom end of the second leg 156. In other embodiments, a single lens or opening can be provided in only the top surface of the body 152 or in the end of the second leg 156 to receive ambient light from either the top side or bottom side of the system to control the operation and function of the system. The lens 158 and lens 164 can be partially covered as needed by a mask, shade or shield to adjust and control the amount of ambient light entering from above and below the occupancy sensor 155. The amount of ambient light entering each of the lenses can be balanced as needed depending on the environment and the location of the system. For example, it may be desirable to control the amount of ambient light entering from above when the system of positioned below or near a skylight. The override unit 150 can have only a single opening in the side or end of leg 156 to receive ambient light only from below.

Figure 21:
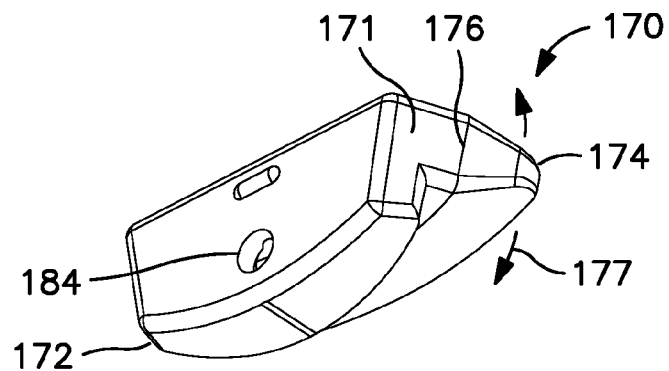
FIG. 21 perspective view of an override unit constructed in accordance with an illustrative embodiment of the present invention.
Figure 22:
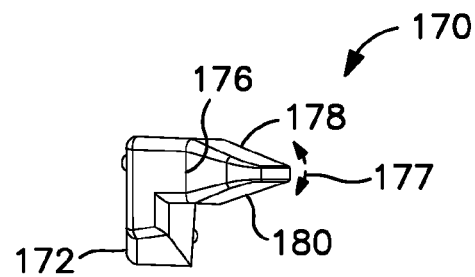
FIG. 22 is a side view of the override unit of embodiment of FIG. 21.
Figure 23:
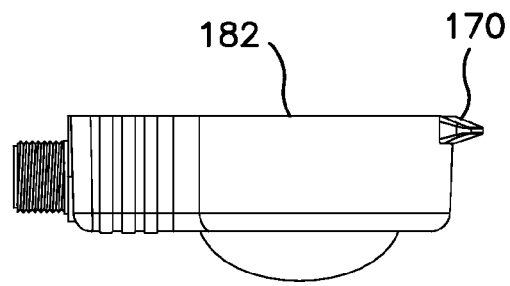
FIG. 23 is a side view of the override unit of FIG. 21 inserted and coupled to the occupancy sensor.

Referring to FIGS. 21-23, an override unit 170 in another embodiment has a substantially L-shape with a body 171, a downwardly extending leg 172 and an outwardly extending leg 174 that is substantially perpendicular to first leg 172. Override unit 170 includes the necessary circuitry and LED as in the previous embodiment direct light to the light sensor of an occupancy sensor 182 to control the occupancy sensor 182. Override unit 170 is coupled to the occupancy sensor 182 in a manner similar to the previous embodiments by inserting the leg 172 into the recess in the rear side of the occupancy sensor 182. Occupancy sensor 182 is substantially the same as in the embodiment of FIGS. 1-12.

The override unit 170 includes a pivotable connection 176 between leg 174 and body 171. Leg 174 includes an upper surface with and outer end having a lens 178 and lower surface with an outer end having a lens 180 for receiving ambient light from above and below the occupancy sensor. In other embodiments, an opening or window can be provided to allow the ambient light to enter the override unit for being directed to the light sensor of the occupancy sensor. As shown in the drawings the lenses 178 and 180 are inclined with respect to the place of leg 174 and are angled to receive ambient light from above and below the system as well as from a side of the system. Leg 174 can be rotated with respect to first leg 172 and the body 171 of override unit as indicated by arrows 177 to aim the light-receiving lens of override unit in the desired direction. As in the previous embodiment internal reflective surfaces or a light pipe can be used to carry the ambient light to the opening 184 aligned with the light sensor of the occupancy sensor 182. A shade or other member for covering or partially covering the lens can be provided to control the amount of light received by the override unit in one direction.

Figure 24:
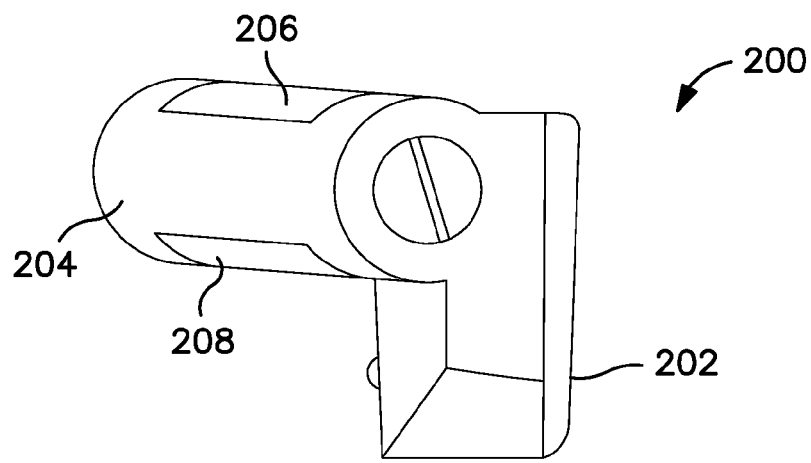
FIG. 24 is a perspective view of the override unit in another embodiment of the invention having a rotating member for adjusting the ambient light entering the unit.
Figure 25:
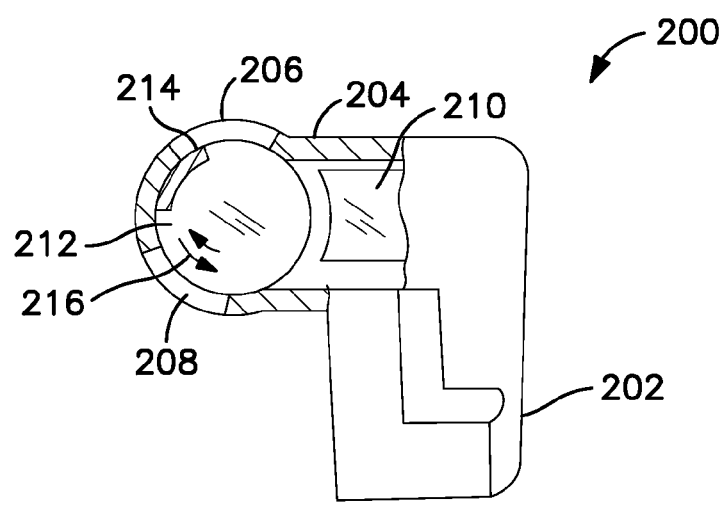
FIG. 25 is a partial cross sectional view of the override unit of FIG. 24 showing the adjustable member.

Referring to FIGS. 24 and 25, another embodiments of the override unit 200 is shown having an adjustable member for aiming the unit in a selected direction to detect ambient light. As shown in FIG. 25, override unit 200 has a first leg 202 which snaps into the recess of the optical sensor unit and includes the internal components such as the circuit board and LED as in the precious embodiments. A body portion 204 of override unit has a cylindrical shape with a top opening 206 facing in an upward direction and bottom opening 208 facing in a downward direction. Override unit 200 includes light pipe 210 extending between body portion 204 and the opening in the first leg 202. A transparent cylindrical member 212 is rotatably mounted within body 204 for conducting light from one or both of the openings 206 and 208 to light pipe 210. Cylindrical member 212 has an opaque portion or member 214 on the outer surface aligned with the openings 206 and 208 to selectively block or partially block one of the openings. Cylindrical member 212 is rotatable as indicated by arrows 216 so that the opaque portion can be oriented between the openings 206 and 208 so that ambient light can enter through each opening 206 and 208, partially block one of the openings or completely block one of the openings. In this manner, the amount ambient light from above and below the occupancy sensor that enters override unit 200 can be adjusted as needed to control the occupancy sensor in a desired manner. Cylindrical member 212 can include detents or other ratcheting members to provide set positions cylindrical member with respect to body 204. In this manner, the position of the cylindrical member 212 can be positioned according to a preset and predetermined positioned to aim the device as needed and so that several of the units can be set consistently with each other.

While various embodiments and features of the invention have been disclosed herein, it will be understood by those skilled in the art that various changes and modifications can be made without departing from the scope and spirit of invention as defined in the appended claims.

What is claimed is:

1. An occupancy sensor assembly comprising:
a load control device having an occupancy sensor for sensing the presence of an object within a field view, a light sensor for sensing ambient light and a first control device for operating a load in response to the light sensor and occupancy sensor; and
an override unit operatively associated with said load control device, said override unit comprising a light source adapted to be detected by said light sensor, and a second control device adapted to control actuation of said light source.

2. The assembly of claim 1, wherein
said load control device has a housing with a recess therein, said light sensor being positioned in said recess, and said override unit is detachably received in said recess where said light source is in communication with said light sensor.

3. The assembly of claim 1, further comprising
a remote control device located remotely with respect to said override unit, said remote control device being configured to communicate with said second control device to control said light source in accordance with an output signal.

4. The assembly of claim 3, further comprising
a remote ambient light sensor operatively connected to said remote control device for producing said output signal to control said remote control device.

5. The assembly of claim 4, further comprising
a plurality of said override units and load control devices; and
said remote control device being in communication with said plurality of override units to control the light source of the respective override units independently of each other.

6. An occupancy sensor assembly comprising:
a housing having a front side with an occupancy sensor adapted for detecting the presence of an object within a field of view and for actuating at least one electrical system in response to detecting the object, said housing having a rear side with a recess formed therein, said recess having an open end facing from said rear side; and
a light sensor in said recess for sensing ambient light, said light sensor being connected to said occupancy sensor for preventing said occupancy sensor from actuating said at least one electrical system when a predetermined level of ambient light is detected, said recess having a dimension to receive a separable override unit operating associated with said light sensor for selectively activating said light sensor.

7. The occupancy sensor assembly of claim 6, wherein
said recess having a bottom wall, and a side wall extending between said bottom wall and said open end to define a cavity and where said light sensor is positioned in said side wall of said recess and facing said cavity.

8. The occupancy sensor assembly of claim 6, wherein
said recess includes a coupling member to removably couple said override unit to said housing, said override unit having a light source to be detected by the light sensor in the recess and preventing said occupancy sensor from actuating said at least one electrical system.

9. The occupancy sensor assembly of claim 8, further comprising
a first control device operatively connected to said occupancy sensor and light sensor for actuating said at least one electrical system in response to a signal from said occupancy sensor, and said override unit includes a second control device to control actuation of said light source.

10. The occupancy sensor assembly of claim 7, further comprising
an override unit having an end removably received in said recess of said rear wall of said housing, said override unit having a light source for directing light to said light sensor to activate said light sensor and deactivate said occupancy sensor.

11. The occupancy sensor assembly of claim 10, wherein said light source is an LED aligned with said light sensor.

12. The occupancy sensor assembly of claim 10, wherein
said override unit is connected to a control unit for actuating said light source at predetermined times and for a predetermined period of time.

13. The occupancy sensor assembly of claim 12, wherein
said override unit has a detent on an outer surface for coupling with a corresponding coupling member in said recess of said rear wall of said housing.

14. The occupancy sensor assembly of claim 10, wherein
the at least one electrical system is a lighting fixture load comprising a plurality of lamps, and said occupancy sensor is configured to not fully energize at least one of the lamps when said light source directs light to said light sensor and activates said occupancy sensor.

15. The occupancy sensor of claim 6, wherein
said override unit includes a light source to be detected by and to activate said light sensor.

16. The occupancy sensor of claim 15, wherein
said override unit activates said light sensor to prevent said occupancy sensor from activating said at least one electrical system.

17. An occupancy sensor assembly comprising:
a housing having a front wall, a rear wall and a side wall extending between said front wall and rear wall and having a first control unit to actuate an electrical device;
an occupancy sensor unit associated with said housing and adapted for sensing the presence of an object within a field of view, said occupancy sensor operatively connected to said first control unit;
a light sensor for detecting light and being operatively connected to said first control unit; and
an override unit removably coupled to said housing and having a light source for directing light to said light sensor to actuate said light sensor.

18. The occupancy sensor assembly of claim 17, wherein
said light sensor is operatively connected to said occupancy sensor to deactivate said occupancy sensor when said light sensor detects light above a predetermined level.

19. The occupancy sensor assembly of claim 17, wherein
said first control unit actuates said electrical device when said light sensor detects light below a threshold level and said occupancy sensor senses an object in a field of view.

20. The occupancy sensor assembly of claim 19, wherein
said override unit includes a second control device to actuate said light source.

21. The assembly of claim 17, wherein
said rear wall of said housing has a recess and where said light sensor has a light receiving member positioned in said recess, and where said override unit is removably coupled to said recess.

22. The assembly of claim 21, wherein
said override unit has a first end received in said recess and where said light source is aligned with said light receiving member for actuating said light sensor.

23. The assembly of claim 17, wherein
said override unit is operatively connected to a controller to actuate said light source at a predetermined time and for a predetermined period of time.

24. The assembly of claim 17, wherein
said electrical device is a luminaire.

25. The assembly of claim 24, wherein
said occupancy sensor unit is configured to not fully energize the luminaire when said light source directs light to said light sensor and activates said light sensor.

26. The assembly of claim 17, further comprising
a remote control device located remotely from said override unit, said remote control device being in communication with said override unit to actuate said override unit and light source at predetermined times.

27. The assembly of claim 26, wherein
said remote control device is operatively connected to a light sensor positioned remotely from said override unit to detect a light level in a location remote from said override unit for actuating said override unit based on the light level at said remote location.

28. The assembly of claim 26, further comprising
a plurality of housings, occupancy sensors, light sensors and override units, and where said remote control device is in communication with each of said override units to operate said override units independently of each other.

* * * * *